(12) United States Patent
Hammerlund

(10) Patent No.: US 9,802,166 B2
(45) Date of Patent: Oct. 31, 2017

(54) VORTEX MIXING SYSTEM

(71) Applicant: Gary Hammerlund, Grand Rapids, MI (US)

(72) Inventor: Gary Hammerlund, Grand Rapids, MI (US)

( * ) Notice: Subject to any disclaimer, the term of this patent is extended or adjusted under 35 U.S.C. 154(b) by 147 days.

(21) Appl. No.: 14/470,261

(22) Filed: Aug. 27, 2014

(65) Prior Publication Data

US 2015/0085601 A1    Mar. 26, 2015

Related U.S. Application Data

(60) Provisional application No. 61/870,259, filed on Aug. 27, 2013.

(51) Int. Cl.
*B01F 5/00* (2006.01)
*B01F 13/00* (2006.01)
*B29B 7/74* (2006.01)

(52) U.S. Cl.
CPC .......... *B01F 5/0057* (2013.01); *B01F 5/0068* (2013.01); *B01F 13/0027* (2013.01); *B29B 7/7438* (2013.01)

(58) Field of Classification Search
CPC .. B01F 5/0057; B01F 5/0068; B01F 13/0027; B29B 7/7438
See application file for complete search history.

(56) References Cited

U.S. PATENT DOCUMENTS

| | | | | |
|---|---|---|---|---|
| 3,485,453 A * | 12/1969 | Peeps | ..................... | B05B 7/1209 239/422 |
| 3,633,795 A * | 1/1972 | Brooks | .................. | B29B 7/7438 222/134 |
| 4,074,363 A * | 2/1978 | Croft | ..................... | B29B 7/7438 222/145.6 |
| 4,666,086 A * | 5/1987 | Cunningham | ............ | B05B 1/00 239/433 |
| 4,936,335 A * | 6/1990 | Macon | .................. | B01F 1/0033 137/268 |
| 5,529,245 A * | 6/1996 | Brown | .................. | B05B 7/1209 222/145.7 |
| 5,740,965 A * | 4/1998 | Miyagi | ............ | A61B 17/00491 239/423 |
| 5,799,876 A * | 9/1998 | Isler | ...................... | B29B 7/7438 239/306 |
| 5,810,885 A * | 9/1998 | Zinger | ................... | A61C 5/064 604/197 |
| 5,893,486 A * | 4/1999 | Wasmire | ........... | B05C 17/00513 222/190 |
| 6,165,201 A * | 12/2000 | Sawhney | ......... | A61B 17/00491 604/197 |
| 6,234,666 B1 * | 5/2001 | Kolb | ..................... | B01F 7/0005 366/279 |
| 6,375,096 B1 | 4/2002 | Rashidi | | |
| 6,461,325 B1 * | 10/2002 | Delmotte | ......... | A61B 17/00491 604/191 |

(Continued)

*Primary Examiner* — Tony G Soohoo
(74) *Attorney, Agent, or Firm* — Gardner, Linn, Burkhart & Flory, LLP

(57) ABSTRACT

A matter displacement and mixing system having a mixing chamber for material to enter, and a vortex aperture that directs air into the mixing chamber at either a high velocity for violent shearing or lower velocity for gentle mixing. This would depend on the shape of the vortex aperture, or the pressure.

5 Claims, 5 Drawing Sheets

(56) References Cited

U.S. PATENT DOCUMENTS

| | | | |
|---|---|---|---|
| 6,835,186 B1 * | 12/2004 | Pennington | A61B 17/00491 604/82 |
| 7,717,357 B2 | 5/2010 | Gantenbein et al. | |
| 2006/0208000 A1 * | 9/2006 | Murray | B29B 7/7404 222/135 |
| 2008/0031081 A1 * | 2/2008 | Rigolio | B01F 5/0644 366/131 |
| 2008/0144426 A1 * | 6/2008 | Janssen | A61O 5/064 366/130 |
| 2010/0065130 A1 * | 3/2010 | Swab | B05B 7/0408 137/170.1 |
| 2010/0065660 A1 * | 3/2010 | Hull | A61B 17/00491 239/428 |
| 2010/0065768 A1 * | 3/2010 | Swab | B29B 7/7404 251/238 |
| 2010/0096481 A1 * | 4/2010 | Hull | A61B 17/00491 239/600 |
| 2011/0209780 A1 * | 9/2011 | Gantenbein | B29B 7/7438 137/539 |
| 2011/0319930 A1 * | 12/2011 | Roush | A61B 17/00491 606/213 |
| 2012/0158048 A1 * | 6/2012 | Roush | A61B 17/00491 606/214 |
| 2013/0028841 A1 * | 1/2013 | Yagi | A61J 1/20 424/9.1 |
| 2014/0107620 A1 * | 4/2014 | Fech | A61M 25/0067 604/518 |

* cited by examiner

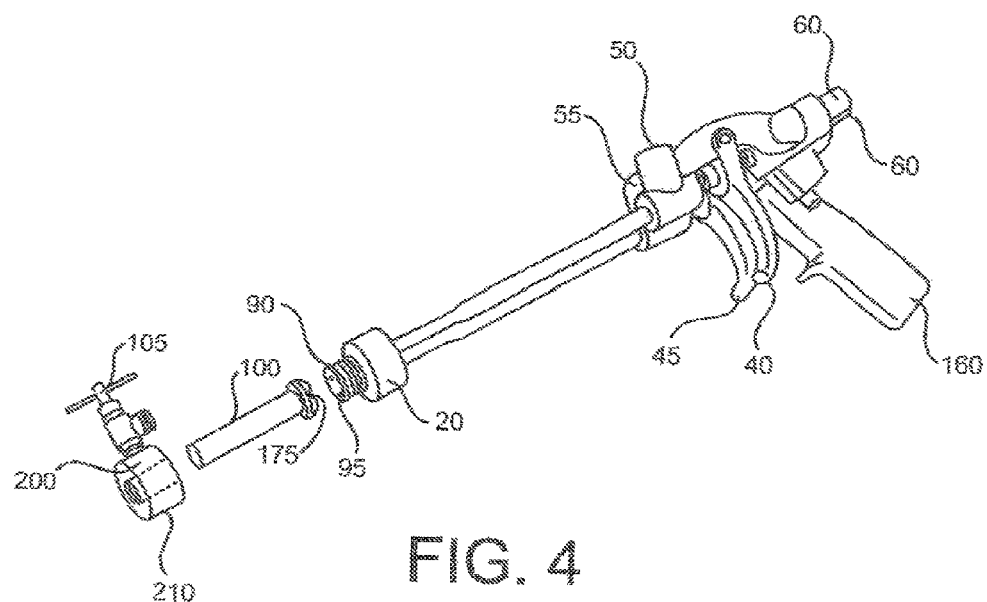
FIG. 4
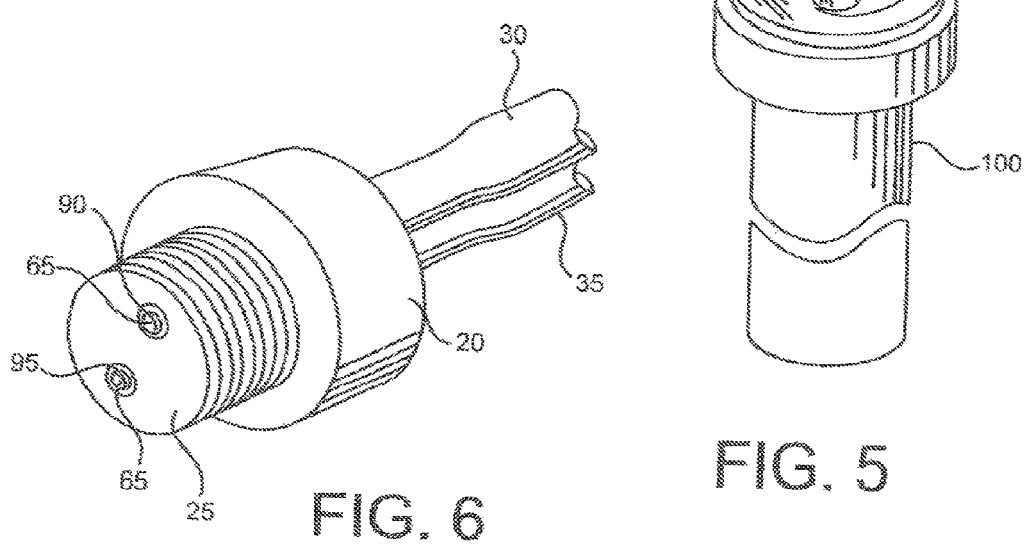
FIG. 6
FIG. 5

VORTEX MIXING SYSTEM

RELATED APPLICATIONS

This application claims priority from a provisional patent application No. 61/870,259 filed on 27 Aug. 2013.

BACKGROUND OF THE INVENTION

U.S. Pat. No. 6,375,096 discloses a two component spray gun and nozzle attachment, the abstract recites, The present invention relates to polyurethane foam spray guns and disposable, attachable nozzles. The spray gun has at least two barrels and metering chambers containing continuous passageways defined by inner bores. Each inner bore can have at least one ramp-shaped slot for controlled metering of a resin. Within each barrel and metering chamber is a plunger. At the front end of the plunger but not the tip is an O-ring that aids in the control of the metering of each resin. At the mid-section of the plunger is at least one O-ring that aids in the prevention of leakage within the spray gun. Both the plunger tip and the discharge opening of each barrel/metering chamber are narrowed/conical. The nozzle contains a one-way valve to prevent the crossover of the resins. The nozzle's tip has different shapes depending on the structure of the foam product desired.

Patent application Ser. No. 7,717,357 discloses a Method for rapid insulation of expanses, the abstract recites, A process for cost-effectively and rapidly insulating a desired surface with spray foam insulation is described which includes the application of a polyurethane foam dispensed through heated conduits into a dispensing gun having a nozzle with essentially planar divergent lips having a triangular prism opening, the lips of the nozzle diverging at an angle of between about 5 and 35° inclusive, more preferably between 8 to 15° inclusive, most preferably 10 to 12° inclusive, thereby achieving application rates which are in excess of 70 $Ft^2$/min, and optimally in excess of 100 $Ft^2$/min.

Portable low pressure two part polyurethane spray foam is primarily supplied in pressurized canisters that when empty are disposed of, or they are supplied in refillable canisters that are pressurized on the jobsite and shipped back to the supplier to be refilled when empty. These portable systems would benefit from the ability to be refilled in the field.

Portable low pressure two part polyurethane spray foam systems are supplied with A & B chemicals that have different viscosities at different temperatures and therefore could benefit from being able to check the flow ratios and adjust them as necessary.

Portable low pressure two part polyurethane spray foam systems are supplied with a disposable spray gun that utilizes disposable tips. A dozen tips or more are supplied with each system. This is because the static mixers clog up within 20-30 seconds of non-use. These systems could benefit from a replaceable tip that can be cleaned and reused.

There exists a need for a spraying system, comprising of two triggers that may connect with each other, serving the purpose of checking the ratio of fluid spraying from one chamber or another so that the user may determine if the system is dispensing chemicals at the proper ratios before spraying, and them may adjust the spray gun accordingly.

There exists a need for canisters that may be refilled in the field, therefore eliminating process of shipping canisters to be refilled, or disposing of them.

There also exists a need for a means of mixing product or foam by means of a vortex mechanism adjacent to the nozzle.

There is also a need for a spray gun that has an attachable nozzle that may be attached to the tip and said nozzle has a vortex mechanism that is air induced and is capable of mixing substances from two chambers into one substance and then spraying the mixed material.

SUMMARY OF THE INVENTION

One aspect of the present invention is a vortex mixing and ratio adjustment system 10, comprising: a mixing nozzle 100 having a vortex aperture 175; and a mixing nozzle aperture 120 extending away from said vortex aperture 175.

Another aspect is a vortex mixing and ratio adjustment system 10, comprising: a vortex aperture 175; a supply line aperture 200; a mixing chamber 115 disposed at the proximal end of a mixing nozzle 100; a left chamber fluid dispenser 90 fluidly connected to said mixing chamber 115; a right chamber fluid dispenser 95 fluidly connected to said mixing chamber 115; whereby a fluid displaced from said supply line aperture 200 under pressure forces any matter entering said mixing chamber 115 to mix at a high speed.

A third aspect of the present invention is a vortex mixing and ratio adjustment system 10 comprising: a left trigger 40 in operational engagement with a left chamber fluid dispenser 90; a right trigger 45 in operational engagement with a right chamber fluid dispenser 95; a mixing nozzle 100 having a vortex aperture 175 and a mixing chamber 115 integral with said vortex aperture 175.

BRIEF DESCRIPTION OF THE DRAWINGS

FIG. 4 is an embodiment of the present invention in a partially dis-assembled configuration;

FIG. 5 is an embodiment of the mixing nozzle of the present invention;

FIG. 6 is an embodiment of the collar and face of the present invention;

DETAILED DESCRIPTION

Reference Numerals

Figure 1:
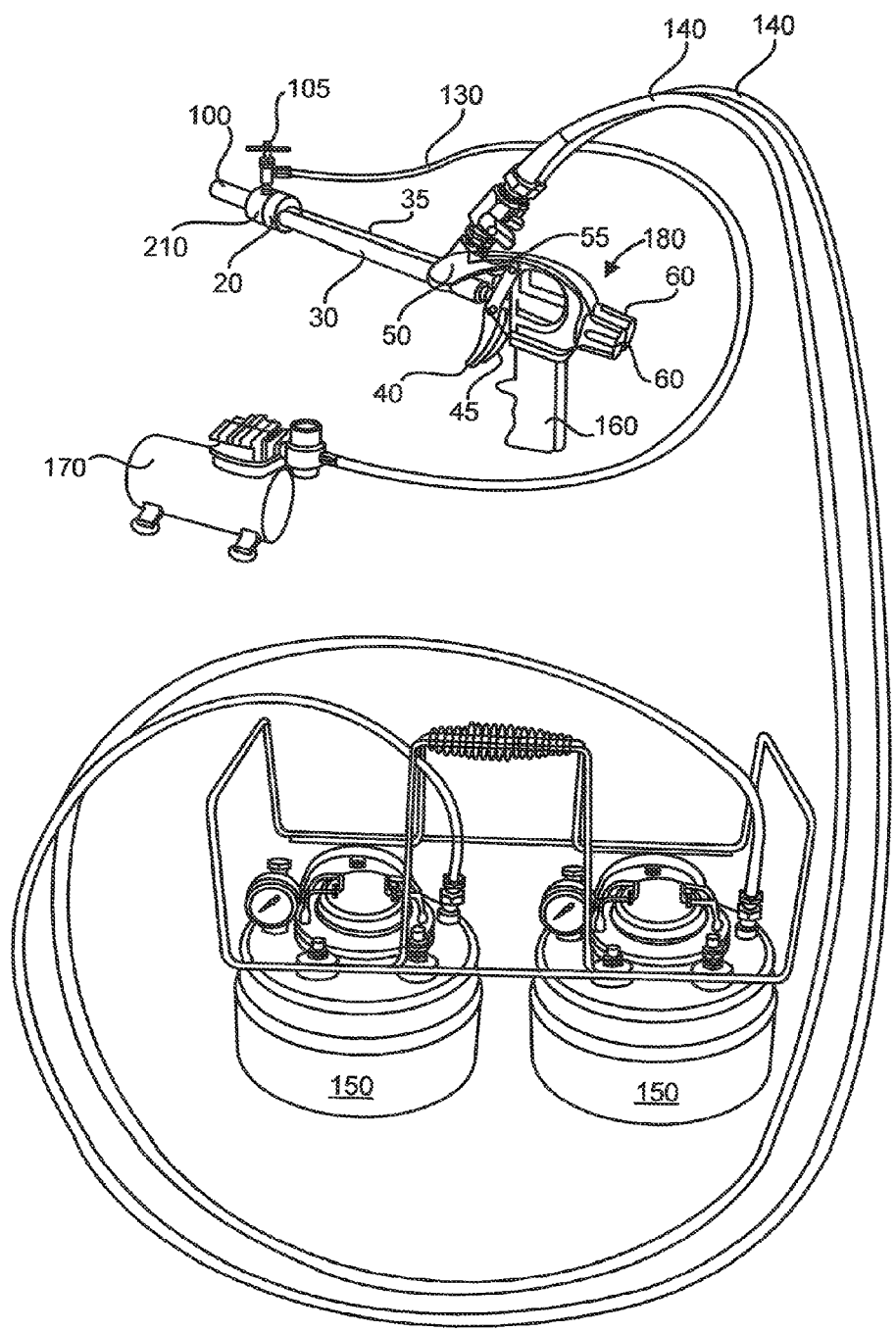
FIG. 1 is a pictorial view of one embodiment of the present invention.

10 spray gun
20 collar
25 face
30 left chamber
35 right chamber
40 left trigger
45 right trigger
50 left intake member
55 right intake member 60 fluid control valves
65 valve rod
70 unison movement means or trigger pin
80 dual trigger
90 left chamber fluid dispenser
95 right chamber fluid dispenser
100 mixing nozzle
105 mixing nozzle pressure control
115 vortex means or mixing chamber
120 mixing nozzle aperture
130 mixing nozzle control tube
140 intake fluid tube
150 fluid canisters
160 spray gun handle
170 air pressure means
175 vortex aperture or displacement intake means
180 proximal end
190 distal end
195 radius
200 supply line aperture or first matter supply aperture
210 supply line member
220 edge
230 horizontal distance of vortex aperture
240 proximal end radius
250 concave portion
260 distal end radius
270 small channel
280 fluid direction in mixing chamber
290 cut-out portion FIG. 1 illustrates an embodiment of the present invention 10, referred to as a spray gun 10. The spray gun 10 is shown as being connected to two fluid intake tubes 140. Each of the intake tube 140 is connected at one end to a left intake member 50 and a right intake member 55 near the proximal end 180 of the spray gun 10, and the opposed end of the intake fluid tube 140 may be connected to a fluid canister 150. The fluid canister 150 may contain the material that is sprayed by the spray gun 10.

Also a mixing nozzle control tube 130 is shown at one end connected to a mixing nozzle pressure control 105, and at the other end to an air pressure means 170.

Figure 7:
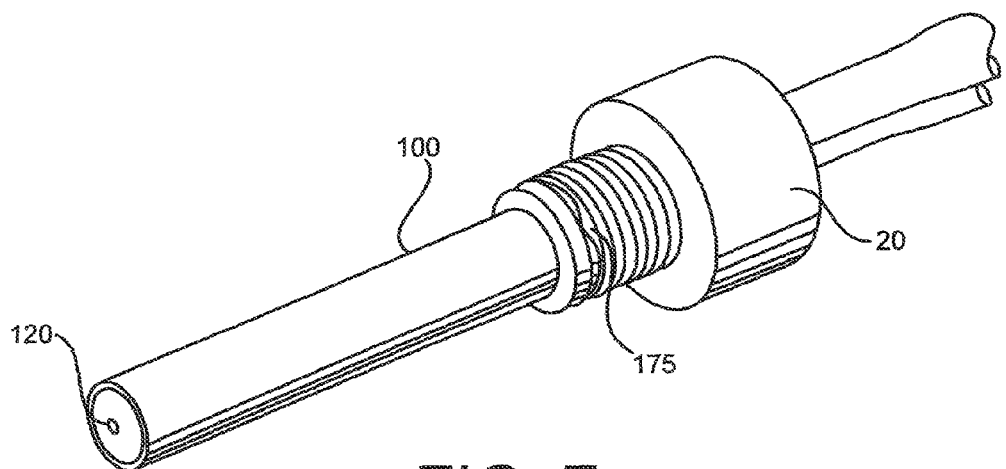
FIG. 7 is an embodiment of a vortex aperture or displacement intake means of the present invention.

In one embodiment, a mixing nozzle 100 is disposed at a distal end of the spray gun 10. A mixing nozzle pressure control 105 can be operationally connected to one end of a mixing nozzle control tube 130 to control the airflow into a vortex aperture 175, as seen in FIG. 7.

Figure 3:
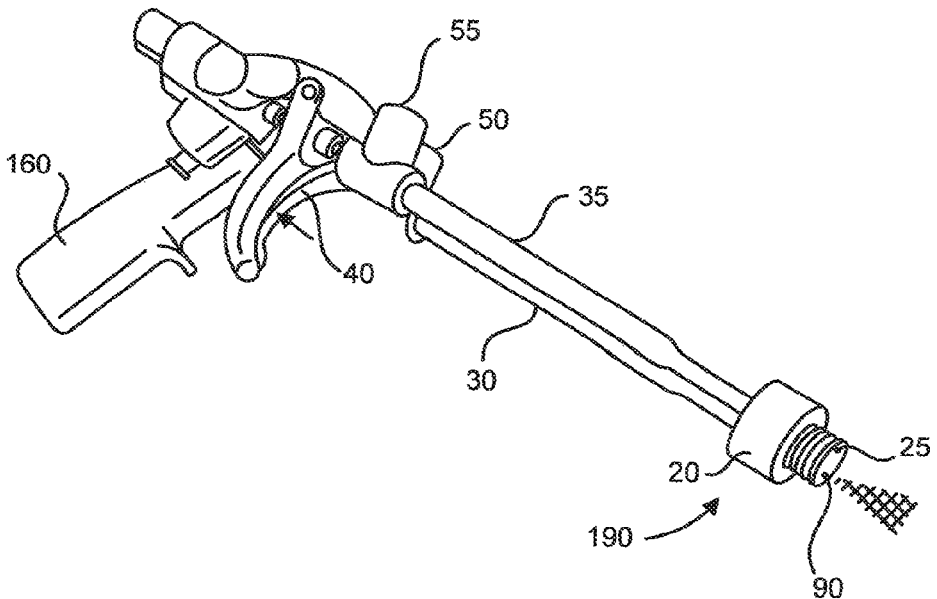
FIG. 3 is another embodiment showing one of two triggers being used.

When the intake fluid tube 140 is connected to the left intake member 50, and when the left trigger 40 is pulled rearwardly, the material in the respective fluid canister 150 is displaced from the fluid canister 150, through the intake fluid tube 140, through the left intake member 50, through the left chamber 30, through the left chamber fluid dispenser 90 (as seen in FIG. 3), through the vortex means 115 (FIG. 5), then through the mixing nozzle aperture 120, to be sprayed on a desired surface.

When the intake fluid tube 140 is connected to the right intake member 55 and the left intake member 50, then the material from each separate fluid canister 150 is thoroughly mixed in the mixing chamber 115 if both triggers are displaced rearwardly.

Figure 2:
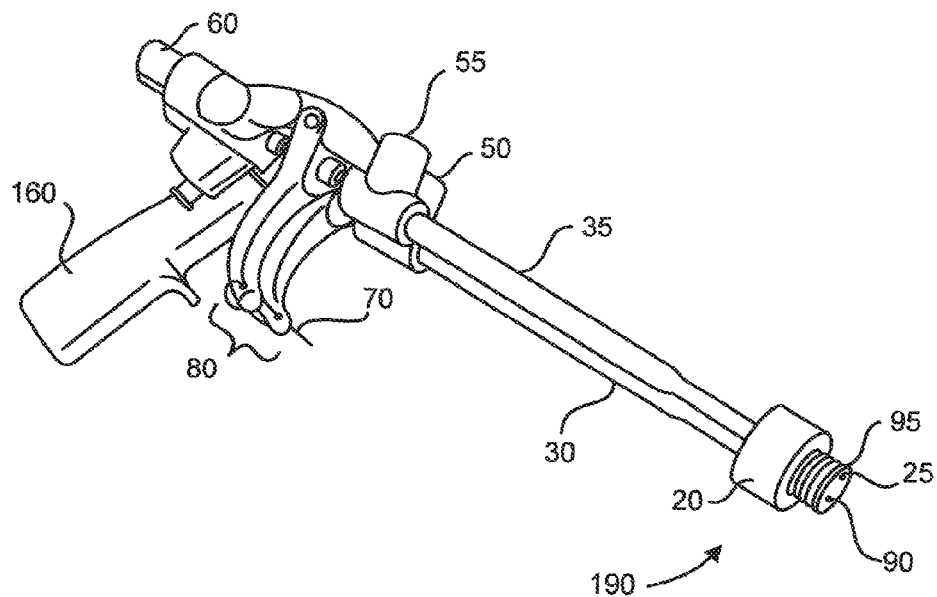
FIG. 2 is another embodiment of the present invention.

FIG. 2 illustrates an embodiment of the spray gun 10 with a unison movement means 70 or a trigger pin 70 disposed through both triggers 40, 45 so they both move in unison. FIG. 2 also illustrates the spray gun handle 160, the fluid control valves 60 which control the amount of material displaced or flowing through the respective chamber 30, 35, and the respective left chamber fluid dispenser 90 and right chamber fluid dispenser 95.

FIG. 2 illustrates the spray gun 10 not connected to any intake fluid tube 140 or any mixing nozzle control tube 130.

FIG. 2 also shows a face 25, at the distal end 190 of the spray gun 10, which contains a left chamber fluid dispenser 90, and a right chamber fluid dispenser 95. The fluid dispensers 90, 95 are apertures that allow for a substance from the fluid delivery system, which may be a canister 150 to be discharged therefrom.

FIG. 3 shows the spray gun 10 without the trigger pin 70. Thus the left trigger 40 and right trigger 45 can be independently operated. For example, as illustrated in FIG. 3, the left trigger 40 is shown as pulled or displaced rearwardly. This position allows the material to flow through the left intake member 50, through the left chamber 30, and out of the left chamber fluid dispenser 90.

The independent trigger operation allows the user to test the flow of the material to make sure that the material flows out of the left chamber fluid dispenser 90 at the same rate as the right chamber fluid dispenser 95.

If, for example, fluid or material is flowing out of one chamber 30, 35 at a slower rate of speed then the other chamber 35, 30 then the user can adjust this problem by adjusting pressure at the fluid delivery system. And the fluid control valves 60 can be used to fine tune the pressure.

Once the fluid flow from each dispenser 90, 95 is equal, the user may insert the trigger pin 70 through both triggers 40, 45 to move in unison.

FIG. 4 illustrates one embodiment of the spray gun 10, with a mixing nozzle 100 disposed immediate adjacent to the face 25 so that any material emanating from the left chamber fluid dispense 90 or right chamber fluid dispenser 95 enter the vortex means 115 (FIG. 5), and then is displaced through the mixing nozzle aperture 120.

FIG. 4 also illustrates a supply line aperture 200, also called a supply line aperture 200 disposed in the supply line member 210. The supply line aperture 200 may be aligned to dispose matter, fluid, or air displaced through the supply line aperture 200 enters the displacement intake means 175, also called the vortex aperture 175, and then enters the mixing chamber 115. Because the vortex aperture 175 may have a smaller opening then the supply line aperture 200, the velocity of the matter, fluid, or air is increased as it enters the mixing chamber 115, thus mixing the matter, foam, fluid that is in the mixing chamber 115, before being forced through the mixing nozzle aperture 120.

The matter mixed by the present invention may be a reactive chemical. The matter may be fluid, gas, liquid or air. The matter could also be solid. The matter may be a polyurethane or polyuria.

In one embodiment, foam in the mixing chamber 115 can be mixed under pressure of between about 30 psi to 120 psi. Matter can also be mixed with other pressures, beneath 30 psi or above 120 psi.

FIG. 5 illustrates that the proximal end of the mixing nozzle 100 that contacts the face 25 has a curved edge 220, also called a vortex aperture 175, which may extend inwardly in the shape of a concave-curved surface 115, referred to as a mixing chamber 115. In one embodiment the mixing chamber 115 has a radius 195 and extends from the vortex aperture 175 to the mixing nozzle aperture 120.

FIG. 5 illustrates one embodiment of the mixing nozzle 100 having one vortex aperture 175. However there may be more than one vortex aperture 175.

Figure 9:
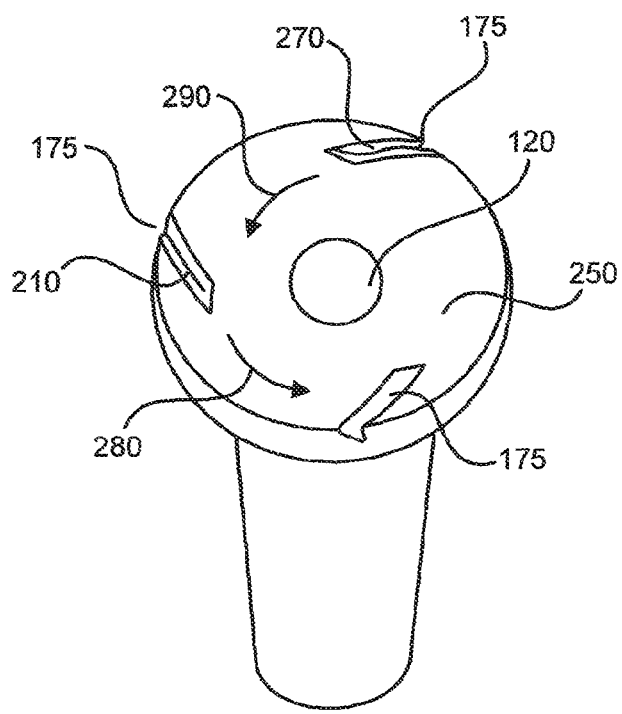
FIG. 9 is another embodiment of a mixing nozzle of the present invention.

FIG. 9 illustrates an embodiment where the mixing nozzle 100 may have three vortex apertures 175. The mixing nozzle 100 may have a concave portion 250 that extends from the vortex aperture 175 inwardly and towards the distal end to the mixing nozzle aperture 120. The vortex apertures 175 may have a cut-out portion 290, best seen in FIG. 10. The cut-out portion 290 may extend inwardly to form a small channel 270 near the edge in a direction so as to direct fluid or air in the mixing chamber 115 in a circular direction 290. In one embodiment the channel 270 has a partial spiral as in FIG. 5, or a more linear channel as seen in FIG. 9. The more linear shaped channel may produce a higher velocity violent shearing action. The partial spiral shape may produce a lower velocity gentler mixing action. Other shaped channels can be used, to vary the mixing action.

FIG. 4 also illustrates a supply line member 210 that may attach the mixing nozzle 100 to the face 25, so that when air pressure is applied through the supply line aperture 200, it then enters the vortex aperture 175. Thus when material is dispensed from the left chamber fluid dispenser 90 and the right chamber fluid dispenser 95, air enters the vortex aperture 175 and forces the separate materials to mix within the mixing chamber 115, and then the mixed materials are dispensed through the mixing nozzle aperture 120 in equal ratios if desired.

FIGS. 6 and 7 illustrate an embodiment of the mixing nozzle 100 adjacent to the face 25, with the vortex aperture 175. In another embodiment, the mixing nozzle 100, vortex aperture 175, mixing chamber 115 may be integral with the face 25.

Figure 8:
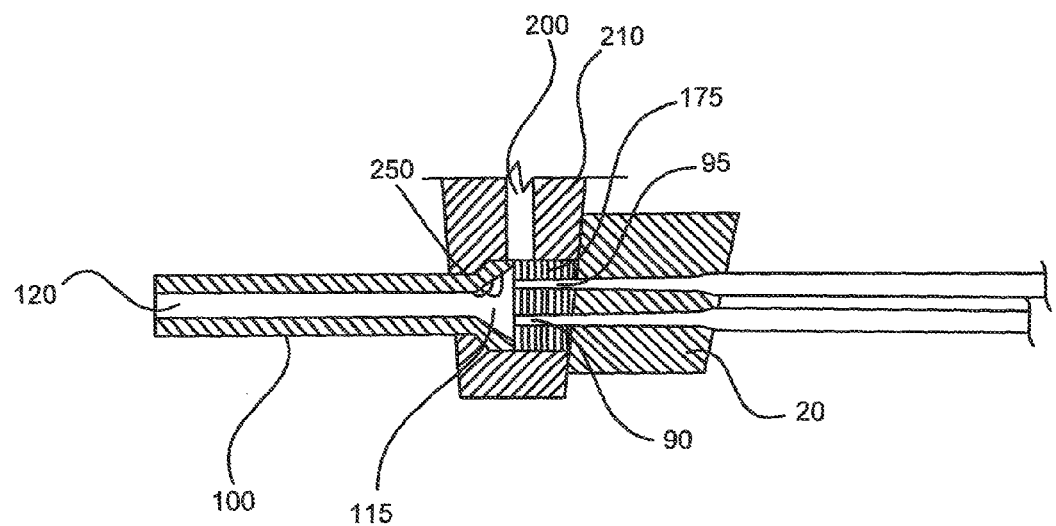
FIG. 8 is an embodiment of a sectional view of the configuration of the supply line aperture of the present invention.

FIG. 8 illustrates a sectional view of the configuration of the supply line aperture 200, also referred to herein as the first matter supply aperture 200. Matter, such as fluid or air may be forced through the vortex aperture 175, also called the displacement intake means 175 and into the mixing chamber 115. The air may swirl around at high velocity causing matter from the left chamber fluid dispenser 90 and the right chamber fluid dispenser 95 to mix together and enter the mixing nozzle aperture 120. The mixed matter or foam can then be sprayed onto a desired surface.

FIG. 9 illustrates an embodiment of the mixing nozzle 100 having three equally spaced vortex apertures 175, and a concave portion that extends to a mixing nozzle aperture 120. FIG. 9 also illustrates the vortex aperture 175 is formed of a small channel 270 to direct fluid direction in mixing chamber in a circular motion.

Although this mixing nozzle 100 is shown separate from the face 25 (FIG. 3), it may be integral with the face 25, and be one unit.

Figure 10:
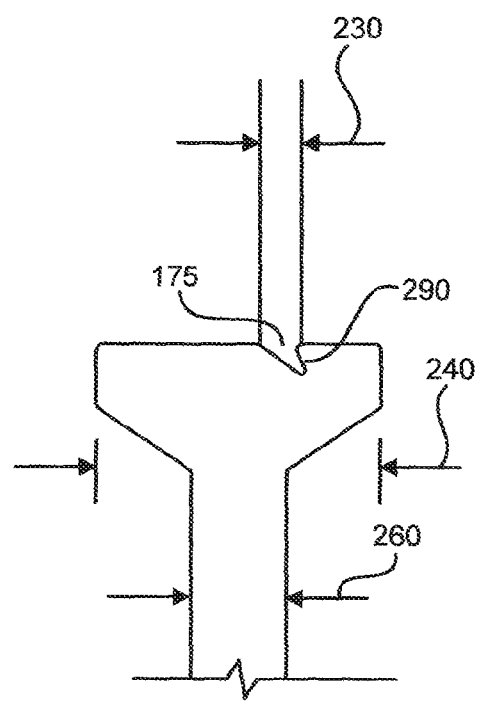
FIG. 10 is a pictorial view of an embodiment of a mixing nozzle of the present invention.

FIG. 10 illustrates an embodiment of the vortex aperture 175 having a horizontal distance 230 of about 1/16", a proximal end diameter 240 of about 3/4" and a distal end radius 260 of about 1/2". Although these dimensions are only examples and these may vary.

I claim:

1. A vortex mixing system (10), comprising:
    a mixing nozzle (100) having a vortex aperture (175);
    a mixing nozzle aperture (120) extending away from said vortex aperture (175);
    a supply line member (210) that is immediately adjacent to a collar (20);
    wherein when air pressure is applied through a supply line aperture (200), pressurized air enters the vortex aperture (175), whereby when a material is dispensed from a left chamber fluid dispenser (90) and a separate material is dispensed from a right chamber fluid dispenser (95), the pressurized air enters the vortex aperture (175) and forces the separate materials to mix within a mixing chamber (115), and then the mixed materials are dispensed through the mixing nozzle aperture (120) in equal ratios if desired.

2. The vortex mixing system of claim 1, further comprising:
    a supply line aperture (200), wherein said vortex aperture (175) is operably connected to said supply line aperture (200);
    a mixing chamber (115) immediately adjacent to said vortex aperture (175);
    whereby when the pressurized air is introduced through said supply line aperture (200) into said mixing chamber (115), any matter disposed in said mixing chamber (115) is mixed together and is forced through said mixing nozzle aperture (120).

3. The vortex mixing system of claim 1, wherein said supply line aperture (200) is configured to supply liquid or solid matter to said vortex aperture.

4. The vortex mixing system of claim 1, further comprising said left chamber fluid dispenser (90), wherein said left chamber fluid dispenser (90) is operably connected to said mixing chamber (115).

5. The vortex mixing system of claim 4, further comprising said right chamber fluid dispenser (95), wherein said right chamber fluid dispenser (95) is operably connected to said mixing chamber (115).

* * * * *